United States Patent
Hagenauer

(10) Patent No.: US 8,249,746 B2
(45) Date of Patent: Aug. 21, 2012

(54) METHOD AND DEVICE TO REGULATE AN AUTOMATED MANIPULATOR

(75) Inventor: Andreas Hagenauer, Friedburg (DE)

(73) Assignee: Kuka Roboter GmbH, Augsburg (DE)

( * ) Notice: Subject to any disclaimer, the term of this patent is extended or adjusted under 35 U.S.C. 154(b) by 294 days.

(21) Appl. No.: 12/765,124

(22) Filed: Apr. 22, 2010

(65) Prior Publication Data

US 2010/0274388 A1   Oct. 28, 2010

(30) Foreign Application Priority Data

Apr. 22, 2009 (DE) .......................... 10 2009 018 403
Oct. 14, 2009 (DE) .......................... 10 2009 049 327
Oct. 14, 2009 (DE) .......................... 10 2009 049 329

(51) Int. Cl.
*G05B 19/18* (2006.01)
(52) U.S. Cl. .......................... 700/250; 700/253; 700/262
(58) Field of Classification Search .................. 700/250, 700/251, 253, 262

See application file for complete search history.

(56) References Cited

U.S. PATENT DOCUMENTS

| | | | | |
|---|---|---|---|---|
| 6,580,969 B1 * | 6/2003 | Ishida et al. | ................... | 700/245 |
| 6,697,709 B2 * | 2/2004 | Kuroki et al. | ................. | 700/245 |
| 6,832,132 B2 * | 12/2004 | Ishida et al. | ................... | 700/245 |
| 6,959,776 B2 * | 11/2005 | Furuta et al. | ................... | 180/8.1 |
| 7,053,577 B2 * | 5/2006 | Nagasaka | ................ | 318/568.12 |
| 7,099,747 B2 * | 8/2006 | Mikami et al. | ................. | 700/245 |
| 7,113,849 B2 * | 9/2006 | Kuroki et al. | ................. | 700/245 |
| 7,840,309 B2 * | 11/2010 | Hasegawa | ..................... | 700/258 |
| 7,848,849 B2 * | 12/2010 | Hasegawa | ..................... | 700/260 |
| 2006/0048364 A1 * | 3/2006 | Zhang et al. | ................ | 29/407.08 |
| 2009/0069942 A1 * | 3/2009 | Takahashi | ..................... | 700/260 |
| 2011/0309782 A1 * | 12/2011 | Bonin et al. | ................... | 318/611 |

* cited by examiner

*Primary Examiner* — Toan To
(74) *Attorney, Agent, or Firm* — Schiff Hardin LLP

(57) ABSTRACT

A method for regulation of a multi-axis automated manipulator, in particular of a robot, includes flexible regulation of at least one guide axis, and rigid regulation of at least one additional axis, and determining a desired value of the at least one additional axis on the basis of a real value of the guide axis.

20 Claims, 2 Drawing Sheets

METHOD AND DEVICE TO REGULATE AN AUTOMATED MANIPULATOR

BACKGROUND OF THE INVENTION

1. Field of the Invention

The present invention concerns a method and a device to regulate a multi-axis manipulator, in particular a robot.

2. Description of the Prior Art

Modern industrial robots are predominantly position-regulated. For this purpose, desired joint positions are generated in an interpolator and supplied to individual joint regulators in the individual actuators of the robot. However, if a desired position is not reached—for example due to an obstacle or an inaccurate environment modeling in the path plan—a pure position regulation increases the drive forces until either manipulated variable limits are exceeded—which leads to the deactivation of the controller—or the robot forcibly approaches the desired position, and thereby possibly damages an obstacle, a component, a tool or itself.

An illustrative example is spot welding with an electrode holder. The electrode holder should be pressed with a predetermined contact pressure force at predetermined points of a component. However, if the component is not in the position on which the welding pose is based in the planning, but rather is shifted in the closing direction of the electrode holder, a merely position-regulated robot would forcibly push the welding electrodes into the predetermined positions and thereby damage the module and one of the electrodes, while the other electrode possibly has no contact with the component. Even if no damage occurs, impermissible forces that could reduce the quality of the welding spot to the point of failure would occur.

In order to solve such problems, it is known to provide targeted passive flexibilities in the robot structure, for example with a feature known as a "Remote Center of Compliance". Due to the task-specific rigidity and flexibility tendencies, however, this is not usable for different application cases. An actively controllable tool connection—for instance an electrode holder with floating bearing that can be adjusted in different compensation positions by means of compressed air or servomotors—must be matched to the respective application case and, like the passive flexibility, requires additional device expense.

Therefore, for a long time force regulations have been tested in research, wherein antiparallel force pairs (i.e. torques) are generally also designated as forces; by force regulation of the type known as force moment regulation ("FMR"). One concept used in industry as "FTCtrl" ("force torque control") is to divide the space in which movement occurs into position-regulated and force-regulated subspaces using a selection matrix. Another known technique is parallel position and force regulation with superimposition of the respective manipulated variables. A further known technique is impedance regulation in which positions and forces are linked via force rules, in particular spring-damper (shock absorber) mass models. For example, there is an overview by H.-B. Kuntze in "Regelungsalgorithmen für rechnergesteuerte Industrieroboter" ["Regulation algorithms for computer-controlled industrial robots"], Regelungstechnik, 1984, S. 215-226 or by A. Winkler in "Ein Beitrag zur kraftbasierten Mensch-Roboter-Interaktion" ["A contribution to force-based human-robot interaction"], Dissertation, TU Chemnitz, 2006.

However, the realization of these approaches regularly runs into difficulties in practice. For example, a force regulation in Cartesian space in order to show a flexibility along one Cartesian direction—for instance along the closing direction of the electrode holder in the above application case—requires a high computing effort with correspondingly slow regulation response. For force regulation of all axes it is problematic to determine the respective proportion of the forces acting on the robot from the motor currents, since the forces can only be imprecisely reconstructed due to gearing conversions, friction and noise.

SUMMARY OF THE INVENTION

An object of the present invention is to improve the response of automated manipulators in practice.

The present invention is based on the following consideration. A yielding movement in Cartesian or working space corresponds to a movement in one or more movement axes (for example pivot bearings or linear axes) of the manipulator. At least one of these axes is defined as a guide axis and is flexibly regulated. Additional axes (advantageously all remaining axes) are rigidly regulated, with a desired value defined on the basis of a real value of the guide axis(axes). The yielding movement in Cartesian space is parameterized via the guiding axis(axes), so to speak. The flexibility can then be represented by the flexible regulation of these guide axis (axes), and the desired yielding movement in Cartesian space can then be ensured via the rigid regulations of the additional axes that follow the yielding guiding axis.

The concept according to the invention can advantageously enable the use of simpler, more robust, more efficient regulators for the guide axes and additional axes, and thus be realized reliably and simply relative to more complicated theoretical approaches.

As used herein a "yielding regulation" is a regulation that produces a movement (in particular an evasion) in response to a force (for example a guide force or a contact force) upon hitting an obstacle. This evasion advantageously ensues depending on the magnitude and/or direction of the force. The flexible regulation is advantageously fashioned as an individual joint regulation of the respective guide axis.

In particular, a flexible regulation can be fashioned as a force regulation. For this purpose, an acting force can be detected, for example, directly by means of a force sensor or a force moment sensor, advantageously at a tool flange of the manipulator. Additionally or alternatively, it can be indirectly detected on the basis of deformations of the manipulator, for example curvatures of its elements. Additionally or alternatively, it can be detected on the basis of a reaction force in an actuator of the manipulator, for example by means of a force or force moment sensor arranged at the actuator. The reaction force can also be determined on the basis of the forces that the actuator must apply in addition to the forces that occur in the case of a contact-free or force-free path, for example in addition to static stop forces or dynamic gyroscopic and acceleration forces. Such forces can be determined on the basis of a current value of an actuator electromotor. The motor currents applied for movement regulation, corrected for gravitational, inertial and friction effects, are essentially linear with regard to the reaction forces in the individual axes. It is noted again that, at present, a torque is also generally designated as a force.

The flexible regulation can be fashioned as an indirect force regulation, in particular as an impedance regulation. It can also be similarly fashioned as a direct force regulation, in particular as a parallel force and position regulation in which both deviations between desired and real forces and deviations between desired and real positions are taken into account and, for example, corresponding manipulated variables are superposed.

A simple possibility of force regulation is to limit the actuation forces of the guide axis. In principle this is position-regulated for this, wherein its actuation force cannot exceed a predetermined limit value (for example by limitation of a maximum desired motor current in a current regulation circuit of a cascade regulator, but also given larger desired-real deviations. As long as an axis that is force-regulated in this manner experiences a resistance that does not exceed the predetermined limit value, it attempts to approach its desired position. If the resistance exceeds this limit value—for example due to a collision with an obstacle—the axis can be displaced and opposes this only with a force corresponding to the limit value; it is thus flexibly regulated.

As used herein, therefore a "rigid regulation" means regulation that approaches a predetermined desired position essentially independent of counteracting forces or optimally produces no deviating movement under a force (for example a guide force or a contact force upon striking an obstacle). Natural upper limits for the actuating forces required for this can be taken into account in order to prevent damage. The rigid regulation is advantageously fashioned as an individual joint regulation of the respective additional axis.

In particular, a rigid regulation can be fashioned as a (pure) position regulation. As used herein "position" or "bearing" regulation means regulation in which a manipulated variable (for example a motor current) is determined on the basis of the difference between desired and real positions, their integrals and/or time derivations, for example a single or multiple proportional (P), differential (D) and/or integral (I) regulation (P, PD, PI, PID), for example in the form of a cascade regulation, advantageously with speed and/or acceleration pilot control.

In a preferred embodiment, a force that the manipulator should flexibly evade and/or a line of application along which the manipulator should flexibly evade is provided (advantageously in advance) in Cartesian or working space, for example by appropriate vectors in a spatially fixed inertial system.

The predetermined force can be, for example, a contact force that the manipulator should exert along the line of application, (for instance a contact pressure force of an electrode holder along its closing direction), and upon exceeding this contact force said manipulator should evade along the line of application.

A predetermined line of action can, for example, be the generation series of positions and orientations of the TCP (tool center point). For example, the series can be defined by a parameterized, six-dimensional vector with three position coordinates and three angle coordinates in Cartesian space. Lines of action are similarly possible that define only the positions or only the orientation of the TCP, for example, and can accordingly be predetermined by a parameterized three-dimensional vector. The specification of a more complex spatial flexibility is also possible, for instance along a plane or another hypersurface, or within a hyperspace in the space of the layers and/or orientations or the configuration space of the joint coordinates. All of these straight lines, curves, surfaces, hypersurfaces and hyperspaces are subsequently designated in general as lines of application for simplification. For example, a plane in Cartesian space in which the TCP of the manipulator should flexibly evade while maintaining the orientation or not, or a sphere within which the TCP should remain given a flexible evasion, can thus be provided by the specification of a line of action in the sense of the present invention.

One or more movement axes of the manipulator can be determined as (a) guide axis(axes) on the basis of a control capability along such a line of application and/or on the basis of an observation capability of this force. As explained in the introduction, a force or a movement along a line of action in Cartesian space produces corresponding force components or movements in individual axes of the manipulator. The magnitude of these components or movements can represent, for example, a measure of the control capability along the line of action or the observation capability of the force. This means that a force that impresses a greater component in an actuator due to the kinematics of the manipulator (in particular the effective lever arms, gearing conversions etc.) can be better observed in this axis. If the manipulator travels over a greater distance along the line of application given movement of an actuator, this line of application can be better controlled by this axis. If a guide axis is therefore selected under consideration of the control and/or observation capability, for example as a weighted sum or penalty function, a force relative to which the manipulator should yield, or a line of action along which the manipulator should yield can be parameterized particularly well with this guide axis.

Since the force components or movements (and therefore the control or observation capability) can change depending on the current pose of the manipulator, in a preferred embodiment it is provided to select different guide axes depending on a pose of the manipulator.

In particular in order to be able to assess the force components or movements (and therefore the control or, respectively, observation capability), in a preferred embodiment the force and/or line of action can be transformed from the Cartesian or, respectively, working space into the joint space that is defined by the value ranges of the individual axes.

This transformation is likewise dependent on the pose of the manipulator. In every case in the range of small changes from a reference pose, the transformation can be approximated by a linear Taylor series expansion. Since such a linear transformation is computationally efficient to implement, in a preferred embodiment the transformation is locally linearized, in particular for a specific pose of the manipulator. Since such a linearization is normally only well approximated locally, it can be implemented for different poses. The transformation can also be adapted for larger working ranges of the manipulator via switching or interpolation of the corresponding linear transformations.

In a preferred embodiment, a desired value of the additional axis linearly depends on a real value of the guide axis(axes). in particular given a linearized transformation, a Cartesian line of action is transformed in a linear function into the joint coordinates so that a parameterization with the joint coordinates of the guide axis(axes) leads to linear functions in the additional axes. However, non-linear functions can also be similarly selected between real values of the guide axis (axes) and desired values of the additional axes. For example, these can be stored as tables, wherein it is possible to interpolate between table values. Particularly advantageous representations in suitable, infinite-dimensional function spaces such as polynomials, splines, finite Fourier series etc. are likewise suitable, possibly due to the shape of the line of application that is predetermined by the application.

In a preferred embodiment, multiple possible lines of application are initially determined in a preferred embodiment. For example, co-linear straight lines or coplanar planes along which the TCP should yield under a change of its orientation can be determined as additional possible lines of application in addition to a straight line or plane in Cartesian space along which the TCP should yield while maintaining its orientation. One of these possible lines of application can then advantageously be selected on the basis of a control capability along the line of action and/or on the basis of an observation capability of the force and be provided as a line of application along which the manipulator should flexibly evade. For example, an evasion movement along a straight line given which the orientation of the TCP changes can thus be controlled better in one axis; in a preferred embodiment this axis is selected as a guide axis, for example via an optimizer.

The number of guide axes advantageously corresponds to the number of degrees of freedom of the provided flexibility or, respectively, the dimension of the line of application that describes this flexibility. If the TCP of a manipulator should be flexible, for example while maintaining its orientation along a straight line in Cartesian space, this is a one-dimensional line of action; the TCP possesses one degree of freedom. A movement axis can then be selected as a guide axis, and the remaining axes can be parameterized with this. In contrast to this, if the TCP should be flexible while maintaining its orientation along a plane in Cartesian space, it is a two-dimensional line of action or hypersurface; the TCP possesses two degrees of freedom. Two movement axes can then be selected as guide axes, and the remaining axes can be parameterized therewith.

In some application cases a manipulator should be flexible only in segments. For example, an industrial robot should execute contact-free paths (for example to take up an initial pose) rigidly and with high precision and should only behave flexibly in a predetermined direction upon contact with the environment (for example by closing an electrode holder). Therefore, a preferred embodiment alternately switches between a flexible regulation of at least one guide axis and a rigid regulation of all movement axes.

DESCRIPTION OF THE PREFERRED EMBODIMENTS

Figure 1:
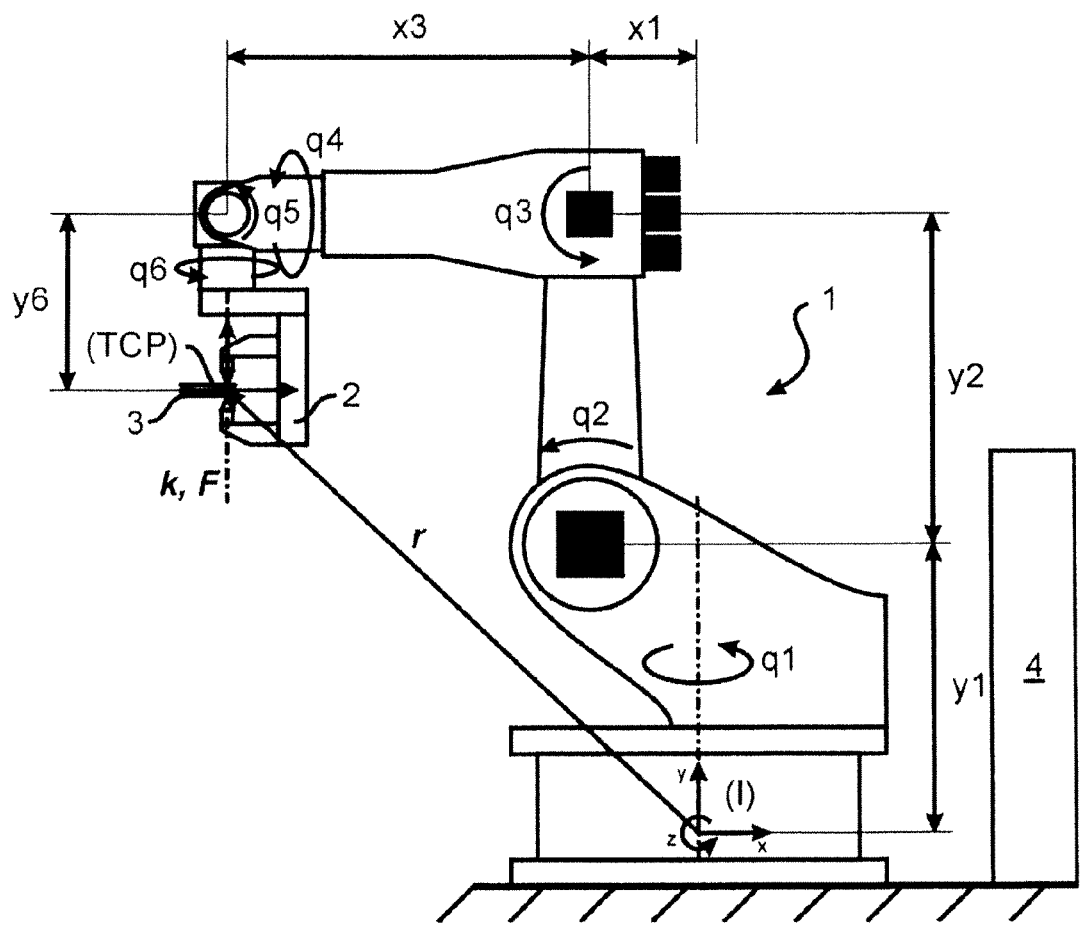
FIG. 1: shows a robot with a control device according to an embodiment of the present invention.

FIG. 1 shows a six-axis articulated arm robot 1 in a base position in which its six axes or, respectively, joint angles q1, q2, ..., q6 exhibit a value of zero. For simplification it is assumed that no movement occurs in the axes 1, 4 and 6, such that only a planar movement and the joint coordinates q2, q3 and q5 are considered in the following that define the corresponding rotation positions of the actuation motors via the respective gearing conversions. In the fixed-base inertial system I, the vector x of the tool reference system TCP of an electrode holder 2 that should spot-weld two plates 3 with the axis intervals x1, ..., y6 drawn in FIG. 1 then reads:

$$x = x(q) = \begin{bmatrix} r_x \\ r_y \\ \varphi \end{bmatrix} = \begin{bmatrix} -x1 - y2 \cdot \sin(q2) - x3 \cdot \cos(q2 + q3) + \\ y6 \cdot \sin(q2 + q3 + q5) \\ y1 + y2 \cdot \cos(q2) - x3 \cdot \sin(q2 + q3) - \\ y6 \cdot \cos(q2 + q3 + q5) \\ q2 + q3 + q5 \end{bmatrix} \quad (1)$$

with the components $r_x$, $r_y$ of the spatial vector r relative to the TCP and the EULER angle $\varphi$ around the z-axis. In the base pose shown in FIG. 1, the Jacobian matrix locally reads:

$$J(q=0) = \frac{\partial x}{\partial q}\bigg|_{q=0} = \begin{bmatrix} -y2+y6 & y6 & y6 \\ -x3 & -x3 & 0 \\ 1 & 1 & 1 \end{bmatrix}. \quad (2)$$

The robot 1 should be flexible in the y-direction of the inertial system y, such that the electrode holder 2 can center in this direction upon approaching the plates 3 with the welding electrodes. For this, along the Cartesian straight lines $$\underbrace{\begin{bmatrix} -x1-x3 \\ y1+y2-y6 \\ 0 \end{bmatrix}}_{s} + \lambda \cdot \underbrace{\begin{bmatrix} 0 \\ 1 \\ 0 \end{bmatrix}}_{k} \quad (3)$$

the TCP of the robot should at maximum apply a force $F_{max}$ $$\underbrace{\begin{bmatrix} 0 \\ F_{max} \\ 0 \end{bmatrix}}_{F_{max}}. \quad (4)$$

According to (2) through (4) and the identities $Q=J^T*F$ and $J*dq=dx$ generally known in robotics, this straight line $s+\lambda k$ and maximum contact force $F_{max}$ can be locally transformed around the point s in the space of the joint coordinates $q=[q2, q3, q5]^T$:

$$s + \lambda \cdot k \rightarrow \underbrace{\begin{bmatrix} 0 \\ -\lambda/x3 \\ \lambda/x3 \end{bmatrix}}_{q_k} =: \begin{bmatrix} 0 \\ \lambda' \\ -\lambda' \end{bmatrix} \quad (5)$$

$$F_{max} \rightarrow \underbrace{\begin{bmatrix} -x3 \cdot F_{max} \\ -x3 \cdot F_{max} \\ 0 \end{bmatrix}}_{Q}$$

Due to the disappearing lever arm, a force F along the straight lines $s+\lambda k$ generates no torque ($Q_z=0$), such that the fifth axis for force moment regulation is not suitable due to poor observation capability. On the other hand, the second axis does not travel, such that the third axis exhibits a better control capability with regard to the line of application $s+\lambda k$.

Therefore, the third axis is selected as a guiding axis and the Cartesian straight line along which the robot 1 should be flexible is parameterized with the joint angle q3. A sufficiently large guidance variable is achieved in this manner, and the contact force can be detected well on the basis of the torque generated in the actuator motor of the third axis.

If the robot 1 with its TCP has taken up the start pose shown in FIG. 1, the third axis is therefore now regulated flexibly. For example, this can ensue in that its desired current is limited in a cascade position regulation that seeks to hold the start position with $q3_s=0$ as a desired position, such that a torque generated at the gearbox output deviates from a torque for compensation of the forces of gravity by a maximum of $\pm x3 \cdot F_{max}$; the robot thus opposes a disruptive movement from the start pose in this axis with at most a torque of $x3 \cdot F_{max}$. Naturally, other flexibility regulations of the third axis are also possible, for example a parallel force position regulation in which manipulated variables of force and position regulators are superimposed or an impedance regulation. A real value of the force acting at the TCP along the predetermined Cartesian straight lines can be determined, for example, from the torque that the force exerts on the actuator of the third axis, and for example can be determined from the motor currents via a corresponding force sensor or force moment sensor (for example at the tool flange of the robot 1) or elastic deformations, for example of its arm.

In contrast, the other axes (in particular the second and fifth axis in the exemplary embodiment) are rigid or position-regulated. For example, for this purpose, a joint angle q2 and q5 and/or a joint angle velocity dq2/dt and dq5/dt can be detected (for example by means of tachogenerators, resolvers or incremental rotary encoders), attributed, and a desired value $q2_s$ and $q5_s$ can be updated in a position-velocity-current cascade regulation.

According to the invention, this desired value for the position-regulated second and fifth axis is determined on the basis of the real value $q3_{meas}$ of the flexibly regulated third axis. According to (5), the desired value $q2_s$ and $q5_s$ can, for example, be provided as $$q2_s = 0 \cdot q3_{mess},$$

$$q5_s = -q3_{mess} \tag{6}$$

If—starting from the start position shown in FIG. 1—the robot 1 now closes its electrode holder 2 to spot-weld the plates 3, it can be—for example due to an imprecise bearing of the plates 3, an imprecise positioning of its TCP or plate thickness tolerances—that the places do not lie at the work point TCP of the electrode holder 2. Upon closing the holder this leads to a reaction force F along the Cartesian straight line $s+\lambda k$, i.e. in the closing direction of the electrode holder 2.

Due to the flexible regulation of the third axis, the robot can evade in this direction. As soon as the torque impressed in the third axis due to the reaction force F exceeds the permissible value $\pm x3\, F_{max}$, the desired current in the motor regulator no longer additionally increases in spite of position deviation, and the robot 1 evades in its third axis under the reaction force.

Due to its rigid position regulations, this evasion movement (i.e. the measured real values of the joint able $q3_{meas}$) leads to a corresponding tracking in the second and fifth axis. They thereby follow the evasion movement of the third axis such that the TCP shifts along the Cartesian straight line $s+\lambda k$, i.e. in the closing direction of the electrode holder 2. The electrode holder 2 centers itself in this manner by means of a simple, robust and fast regulator.

As is clear from the exemplary embodiment, given a linear dependency of the desired values of the position-regulated axes on the real value of the guiding axis according to (6) the TCP generally shifts only approximately along a straight line in Cartesian or working space. However, this can already be sufficient given the application case of spot welding with correspondingly small feed travels (normally of 1 to 2 cm).

The method according to the invention can generally also be similarly used for larger paths, for example in that the linearization—in particular the evaluation of the Jacobian matrix according to (2)—is repeated per segment or for different poses of the robot 1 and is matched to the altered kinematics. The guiding axis can thereby also possibly be changed. An additional possibility for larger paths is to show the desired line of action in Cartesian space via an approximation of higher order in joint space instead of the approximation of the line of action by a straight line in joint space that is parameterized via the guiding axis (i.e. the linearization shown in the exemplary embodiment), wherein again a representation should advantageously be shown in which the following axes appear as a function of the guiding axis.

Figure 2:
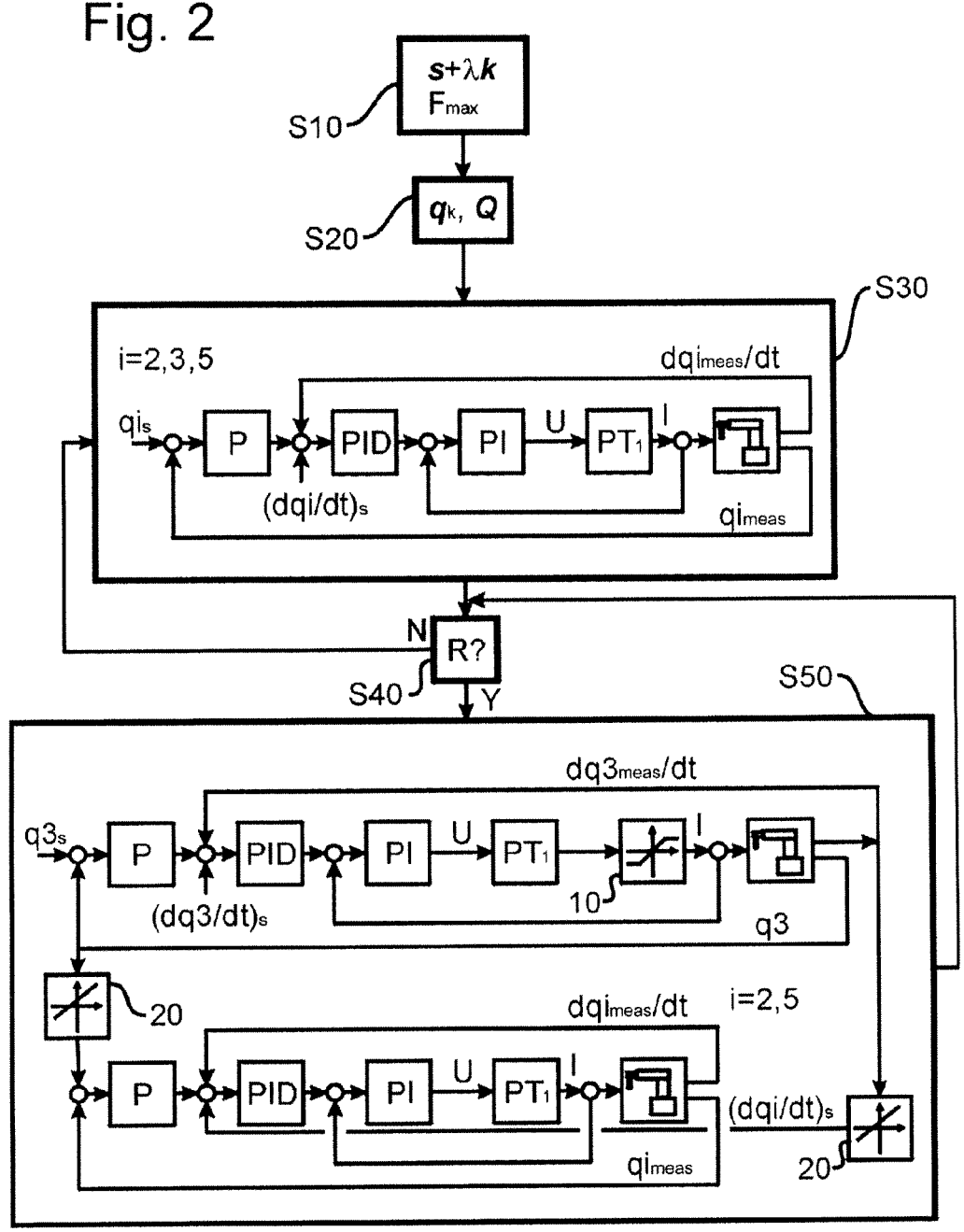
FIG. 2 illustrates the execution of a method according to an embodiment of the present invention by the control device according to FIG. 1.

FIG. 2 illustrates a corresponding regulation that, for example, can be implemented in the robot controller arranged in a control cabinet 4.

In a first Step S10 the Cartesian straight lines $s+\lambda k$ along which the robot should be flexible and regulation parameters (for example a maximum force $F_{max}$, as of which the robot should evade) are provided (advantageously in advance, offline).

The associated joint angles $q_k$ and torques Q are determined from these in Step S20, possibly for multiple poses and advantageously in a linearized fashion. A guiding axis (presently the third axis) is selected on the basis of the observation capability of a force along the Cartesian straight line, i.e. the magnitude of the torque impressed by this in the actuator motor, and the control capability, i.e. the magnitude of the adjustment travel of the respective axis upon movement along the Cartesian straight line.

The robot 1 takes up its start pose with a pure position regulation of all axes 2, 3, 5. For this a cascade regulation for the individual axes i=2, 3 and 5 with a proportional position regulator, a velocity pilot control, a PID regulator and a proportional integral motor regulator or, respectively, current regulator is indicated in Step S30.

As soon as the robot 1 has taken up its start pose, the regulation according to the invention is switched to (S40: "Y").

In this the third axis is flexibly regulated. For this in Step S50 a desired current limitation 10 is indicated. The remaining axes i=2, 5 are position-regulated, wherein their desired values no longer result from the interpolator of the robot controller 4, however, but rather result from the real values of the third axis, as is likewise indicated by the element 20 in Step S50.

As soon as the spot welding process has ended, the regulation returns to a pure position regulation for all axes (S40: "N"). A desired-real compensation of the axis positions is thereby advantageously implemented.

In the above exemplary embodiment, upon yielding along the straight line $s+\lambda k$ the TCP locally maintains its orientation at ($\phi=q2+q3+q5=0$). If this requirement is abandoned, due to cessation of the third line in (2) a different line of action can be parameterized, for example by $$q3_s = -q2_{meas},$$
$$q5_s = \frac{y2}{y6} \cdot q2_{meas}. \tag{7}$$

If an axis exhibits a better control and/or observation capability in this regard than the third axis with regard to (6), this axis—for example the second axis in (7)—can be defined as a guide axis—for example by an optimizer that takes the control and observation capability into account as quality criteria—and the line of application can be provided according to (7).

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for regulating a multi-axis automated manipulator, comprising the steps of:
   from a computerized control unit in communication with a multi-axis automated manipulator, flexibly regulating at least one guide axis of the manipulator;
   from said computerized control unit, rigidly regulating at least one additional axis of said manipulator;
   in said computerized control unit, automatically determining a desired value of said at least one additional axis based on a real value of the guide axis; and
   from said computerized control unit, causing said at least one additional axis to assume the desired value in the rigid regulation of said manipulator.

2. A method as claimed in claim 1 comprising, from said computerized control unit, flexibly regulating said manipulator to move within a working space and, in said working space, defining at least one of a force and a line of action that said manipulator should flexibly evade, and, from said computerized control unit, flexibly regulating said at least one guide axis of said manipulator to cause said manipulator to evade said at least one of said force and line of action.

3. A method as claimed in claim 1 comprising flexibly regulating said manipulator from said computerized control unit within a working space and defining multiple lines of action within said working space dependent on at least one factor selected from the group consisting of control capability of said at least one guide axis of the manipulator along each line of action, and forces acting on said manipulator along each of said lines of action, and, in said computerized control unit, automatically selecting one of said lines of action as a selected line of action and flexibly regulating said at least one guide axis of said manipulator to cause said manipulator to flexibly evade said selected line of action.

4. A method as claimed in claim 3 comprising selecting at least one movement axis of said manipulator as said guide axis dependent on said at least one factor.

5. A method as claimed in claim 1 wherein said manipulator comprises a plurality of articulated joints defining a joint space and comprising, in said computerized control unit, transforming said feature into said joint space, as a joint space transformed feature, and making the selection of said selected line of action using said joint space transformed feature.

6. A method as claimed in claim 5 comprising transforming said feature into said joint space using a transformation selected from the group consisting of a locally linearized transformation and a locally adapted transformation.

7. A method as claimed in claim 1 comprising implementing said flexible regulation from said computerized control unit as a force regulation.

8. A method as claimed in claim 7 comprising implementing said force regulation as an indirect force regulation.

9. A method as claimed in claim 8 comprising implementing said indirect force regulation as an impedance regulation.

10. A method as claimed in claim 7 comprising implementing said flexible regulation in said computerized control unit as a direct force regulation.

11. A method as claimed in claim 10 comprising implementing said direct force regulation as a parallel force and position regulation.

12. A method as claimed in claim 7 wherein said manipulator comprises a plurality of actuators that respectively move said manipulator with respect to different axes, one of said actuators moving said manipulator with respective to said guide axis, and comprising, in said computerized control unit, implementing said force regulation dependent on a force detected as a reaction force of said one of said actuators.

13. A method as claimed in claim 12 wherein said one of said actuators is an electromotor supplied with current, and comprising detecting said reaction force based on a value of current supplied to said electromotor.

14. A method as claimed in claim 1 comprising implementing said rigid regulation from said computerized control unit as a position regulation.

15. A method as claimed in claim 1 comprising, in said computerized control unit, determining said desired value of said additional axis based on a linear dependency on said real value of said guide axis.

16. A method as claimed in claim 1 comprising, in said computerized control unit, determining said desired value of said additional axis based on a non-linear dependency on said real value of said guide axis.

17. A method as claimed in claim 1 comprising alternatingly switching regulation of said manipulator from said computerized control unit between said flexible regulation and said rigid regulation.

18. A method as claimed in claim 1 comprising operating said manipulator from said computerized control unit to assume a plurality of different poses, and selecting a different guide axis in said computerized control unit, for use in said flexible and rigid regulation of said manipulator, dependent on the pose of the manipulator.

19. A computerized control device for regulating a multi-axis automated manipulator, comprising the steps of:
   a processor;
   an interface placing said processor in communication with a multi-axis automated manipulator;
   said processor being configured to flexibly regulate at least one guide axis of the manipulator via said interface;
   said processor being configured to rigidly regulate at least one additional axis of said manipulator via said interface;
   said processor being configured to automatically determine a desired value of said at least one additional axis based on a real value of the guide axis; and
   said processor being configured to cause said at least one additional axis to assume the desired value in the rigid regulation of said manipulator via said interface.

20. A non-transitory computer-readable storage medium encoded with programming instructions, said storage medium being loadable into a computerized control unit of a multi-axis automated manipulator, and said programming instructions causing said computerized control unit to:
   communicate with said multi-axis automated manipulator to flexibly regulate at least one guide axis of the manipulator;
   communicate with said multi-axis automated manipulator to rigidly regulate at least one additional axis of said manipulator;
   automatically determine a desired value of said at least one additional axis based on a real value of the guide axis; and
   communicate with said multi-axis automated manipulator to cause said at least one additional axis to assume the desired value in the rigid regulation of said manipulator.

* * * * *